US009110864B2

(12) United States Patent
Jamjoom et al.

(10) Patent No.: US 9,110,864 B2
(45) Date of Patent: Aug. 18, 2015

(54) FAULT TOLERANCE SOLUTION FOR STATEFUL APPLICATIONS

(71) Applicant: International Business Machines Corporation, Armonk, NY (US)

(72) Inventors: Hani T. Jamjoom, Cos Cob, CT (US); Shriram Rajagopalan, Yorktown Heights, NY (US); Daniel J. Williams, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/925,872

(22) Filed: Jun. 25, 2013

(65) Prior Publication Data

US 2014/0380087 A1    Dec. 25, 2014

(51) Int. Cl.
*G06F 11/00*    (2006.01)
*G06F 11/20*    (2006.01)
*G06F 11/14*    (2006.01)

(52) U.S. Cl.
CPC ........ *G06F 11/2002* (2013.01); *G06F 11/1484* (2013.01); *G06F 11/2028* (2013.01)

(58) Field of Classification Search
None
See application file for complete search history.

(56) References Cited

U.S. PATENT DOCUMENTS

| | | | | |
|---|---|---|---|---|
| 5,621,885 A | * | 4/1997 | Del Vigna, Jr. | 714/13 |
| 5,996,086 A | * | 11/1999 | Delaney et al. | 714/4.11 |
| 6,266,781 B1 | * | 7/2001 | Chung et al. | 714/4.1 |
| 6,625,751 B1 | | 9/2003 | Starovic et al. | |
| 7,124,320 B1 | * | 10/2006 | Wipfel | 714/13 |
| 7,392,421 B1 | * | 6/2008 | Bloomstein et al. | 714/4.4 |
| 8,312,308 B2 | | 11/2012 | Kanekar | |
| 2004/0243650 A1 | * | 12/2004 | McCrory et al. | 707/203 |
| 2004/0268175 A1 | * | 12/2004 | Koch et al. | 714/4 |
| 2007/0006226 A1 | | 1/2007 | Hendel | |
| 2008/0189468 A1 | | 8/2008 | Schmidt et al. | |
| 2009/0006888 A1 | * | 1/2009 | Bernhard et al. | 714/6 |
| 2009/0113109 A1 | * | 4/2009 | Nelson et al. | 711/6 |
| 2010/0325474 A1 | | 12/2010 | Gopinath et al. | |
| 2011/0213753 A1 | * | 9/2011 | Manmohan | 707/640 |

OTHER PUBLICATIONS

Mell et al., "The NIST Definition of Cloud Computing", Version 15, Oct. 7, 2009, pp. 1-2.
Scales et al., "The Design and Evaluation of a Practical System for Fault-Tolerant Virtual Machines", Technical Report VMware-TR-2010-001, May 11, 2010, pp. 1-24.

(Continued)

*Primary Examiner* — Gabriel Chu
(74) *Attorney, Agent, or Firm* — Reza Sarbakhsh; Louis J. Percello

(57) ABSTRACT

A fault tolerance method and system for VMs on a cluster identifies a client state for each client session for those applications. The method replicates the client session onto a primary and a backup VM, and uses a network controller and orchestrator to direct network traffic to the primary VM and to periodically replicate the state onto the backup VM. In case of a VM failure, the method reroutes network traffic of states for which the failed VM serves as a primary to the corresponding backup, and replicates states without a backup after the failure onto another VM to create new backups. The method may be used as part of a method or system implementing the split/merge paradigm.

20 Claims, 7 Drawing Sheets

(56) References Cited

OTHER PUBLICATIONS

Rajagopalan, et al., "SecondSite: Disaster Tolerance as a Service", VEE'12, Mar. 3-4, 2012, London, England, UK.

Minhas et al., "RemusDB: Transparent High Availability for Database Systems", Proceedings of the VLDB Endowment, vol. 4, No. 11, pp. 738-748.

* cited by examiner

FAULT TOLERANCE SOLUTION FOR STATEFUL APPLICATIONS

FIELD

The present application relates generally to computer networking and more particularly to fault tolerance solutions in cloud computing environments.

BACKGROUND

In cloud computing environments, applications are often configured to run on a cluster of virtual machines ("VMs") that may run on one or more physical computers or nodes, such that each member of the cluster processes a part of the input to the cluster. This allows the applications to withstand greater loads that, without the cluster, may overwhelm the applications. Fault tolerance is an important aspect of a scalable application design in a cluster of VMs. Failure of one application instance or its physical host disrupts the network traffic flowing through it. This disruption may manifest itself as a connection loss between a client (for example, a browser application) and a server application (for example, a middlebox application) running on the cluster. Fault tolerance designs aim to allow applications to recover from failure without impacting the connectivity between the server and the client.

However, application level fault tolerance solutions increase design complexity, are specific to a particular application (and therefore not readily usable with other applications), and cannot completely mask failures (such as loss of client connectivity). While certain classes of large scale applications have built-in support for fault tolerance, commodity applications often resort to system level solutions to preserve application state upon failure. However, these solutions are often heavyweight and require a great amount of resources to backup a cluster of virtual machines. In many existing solutions, these problems could lead to load imbalance upon failure of one or more VMs in heavy load scenarios.

Referring now to FIGS. 1-2A, a method 100 (shown in FIG. 1) according to the prior art may be configured for execution by a processor on a computer system to perform load balancing of stateful applications running on a cluster of virtual machines (VM) using a split/merge paradigm. The VM cluster may physically reside on one or more interconnected computer systems, which may be nodes in a cloud computing environment. FIG. 2A depicts one such cluster 200 having one VM 212 (designated as VM 1) hosting a set of client sessions 230 {A, B, C, D} via a network controller 204 and an orchestrator 208. Each client session 230 has a corresponding client state 224 in one or more VMs 212. The client state 224 for a given client session 230 does not contain the corresponding application state, operating system state, or other states that are not unique to that client session 230. Rather, the client state 224 contains the corresponding client state: a subset of the data that the corresponding client session 230 requires to run one or more stateful applications in the VM's 212 application layer 216 (the client state may include, for example, time/session state for a client session, NAT configurations for a particular flow, etc.).

Referring now to FIGS. 1-2A, the client sessions 230 connect to the cluster 200 in step 104 of the method 100 by communicating with the network controller 204. The network controller 204 is responsible, in part, for directing network traffic flow (including, for example, by inspecting packet headers) of the client sessions 230 from their respective clients to VM1 (as well as to and between other VMs 212 that may be in the cluster 200). The network controller 204 communicates with the orchestrator 208 to determine which VM 212 holds or should service the client session 230. The orchestrator tracks the load on each VM 212 in the cluster 200, the location of each client state 224, as well as all other necessary network information (such as operating system, application information, etc.). In the depicted example, the network controller determines that each of the {A, B, C D} client sessions 230 should have their corresponding client states 224 present and processed on VM1 (in addition to other information associated with the client session 230 which may be necessary for servicing the corresponding client's use of the applications on the VM 212). The network controller 204 communicates this choice to VM1. The network controller 204 directs the network traffic flow for the client sessions {A, B, C, D} to VM1, after consulting with the orchestrator 208. VM1, and the VMs 212 on the network, generally, each have a system library 220 that provides the API necessary to generate a client state 224 for each client session 230 that they service. The API may be provided at the hypervisor level accessible to applications on a given VM 212, and allows the applications to create, store and retrieve per-client states (for example, client session states) and global states in the applications. The API may include, for example, the following:

```
ID = create_state(size)
state_object = get_state(ID)
put_state(ID, state_object)
gID = create_global(size)
global_state_obj = get_global(gID)
put_global(ID, global_state_obj)
```

It will be apparent to one of ordinary skill in the art, based on the above table, how to implement an API to perform the recited functions of creating, storing, and retrieving per-client states. Applications running on the VMs 212 may use the above API to: get a client request; get the session ID based on the request; generate a state object by getting the relevant state; process the client request (including updating the state object and global states); store the updated state; and to reply to the client.

With continued reference to FIGS. 1-2A, FIG. 2A shows the status of the cluster 200 having one active VM 212 (designated as VM1) after four client sessions communicate with the cluster 200 through step 104 of the method 100. The active client sessions 230 are designated as {A, B, C, D}, and each client session 230 has a corresponding client state 224 on VM1.

Referring now to FIGS. 1 and 2B, two additional client sessions 230 designated as {E} and {F} are initiated in step 104 of the method 100. The client sessions {E, F} communicate with the network controller 204, which in turn communicates with the orchestrator 208, to select an available VM 212, i.e. VM1 for client sessions {E, F}. The method 100 may, through the orchestrator and the network controller, direct the network traffic flow of the client sessions {E, F} to VM1. The cluster 200 depicted in FIG. 2B services the newly initiated client sessions {E, F} in addition to client sessions {A, B, C, D} depicted in FIG. 2A, above.

Referring now to FIGS. 1 and 2C, before, during, or after performing step 104, the method 100 may evaluate the status of the cluster 200 in step 108 to determine whether the cluster 200 is load balanced. Having too many client sessions 200 serviced through too few VMs 212 is generally undesirable and may lead to a significant performance loss. Therefore, the method 100 may split the load of one or more VMs 212 in the cluster 200, and transfer some client states 212 to less burdened VMs 212 in step 112. By way of example, the method 100 may perform step 108 after the client sessions {A, B, C, D, E, F} are serviced via VM1. By analyzing the load of VM1 in step 108, the method 100 may determine that VM1 is overloaded and requires rebalancing.

With continued reference to FIGS. 1 and 2C, the method 100 may make additional VMs 212 available on the cluster 200, i.e. VM2 and VM3. The method 100 may, through the network controller 204 and the orchestrator 208, select an appropriate VM 212 for each client session 230 to be moved. Since each client session's 230 load on a particular VM 212 is unique only at the granularity of its client state 224, all that the method 100 needs to move to a new VM 212 is that client state 224. Other information and states, such as operating system states and other application states already exist on other VMs 212 in the cluster 200 and need not be copied. Therefore, the method 100 may move the client states 224 for the selected client sessions 230 to the newly selected VM 212. In the example depicted in FIG. 2C, the orchestrator designates VM2 as a suitable VM 212 to service client sessions {C, D}, and VM3 as suitable for client sessions {E, F}. The network controller 204 moves the client state 224 associated with each of these client sessions 230 to the appropriate VM 212 in step 112, and directs the network traffic flow for each of the moved client sessions 230 to the appropriate VM 212 in step 116. During the time that the network controller 204 is moving a particular client state 224 to a different VM 212 in step 112, the network traffic flow of the corresponding client session 230 may be buffered and subsequently redirected to the new VM 212 in step 116.

Referring now to FIGS. 1 and 2C-D, one or more of the client sessions 230 depicted in FIG. 2C may terminate. For example, as depicted in FIG. 2D, client sessions {A, B} are no longer active. In step 108, the method 100 performs a load balancing check and may determine, based on a determination by the orchestrator 208, that the load balance of the cluster 200 is spread out too thinly. For example, the cost of operating an additional VM 212 may outweigh the efficiencies from having the four remaining client sessions 230 serviced by two different VMs 212. The method 100 may determine, then, that one or more of the client states 224 on one or more VMs 212 should be merged into a smaller number of VMs 212. In the example depicted in FIG. 2C, the method 100 merges the client states 224 of the active client sessions {C, D, E, F} into VM 2.

The network controller 204 and the orchestrator 208 may each be implemented as a program, hardware component, or a combination thereof. Each of them may, without limitation, be integrated into a single computer program running on one or more of the systems or nodes in the cluster 200. The orchestrator 208 may split or merge the contents of the VMs 212 on the cluster 200 at particular thresholds. These thresholds may be made configurable by a user, such as a network administrator, or may be configured to change according to predefined conditions.

Referring now to FIG. 1, steps of the method 100 may be formed in any order in sequence, or simultaneously. They may further be performed periodically. Additionally, steps of the method 100 may be configured to trigger the performance of its other steps. For example, while the method 100 may periodically perform load balancing checks in step 108, it may additionally perform this step immediately upon receiving a new client connection and before directing its associated network traffic flow to a particular VM.

Referring now generally to FIGS. 1-2D, the method 100 as described above facilitates a split/merge mechanism to load balancing of a cluster of VMs running applications that service client sessions 230. However, the method 100 does not provide fault tolerance. Failure of one or more VMs 212 in the absence of the disclosed invention's fault tolerance functionality may result in a loss of the client states 224 running on the failed VM 212.

It is therefore desirable to provide an elastic and lightweight fault tolerance solution for stateful applications operating in a cluster, having a transparent and load balanced recovery mechanism.

BRIEF SUMMARY

A method for providing fault tolerance on a virtual machine (VM) cluster, according to an embodiment of the invention, includes identifying a client state, wherein the client state is a subset of a corresponding client session having a network traffic flow directed to a primary virtual machine (VM) on a VM cluster. The method replicates the identified client state on a backup VM in the VM cluster according to a predefined criteria. The method detects whether a VM in the VM cluster has failed, and determines a first set of client states for which the failing VM is a primary VM, and a second set of client states for which the failing VM is a backup VM. The method designates the backup VM for each of the client states in the first set as a new primary VM for that client state, and replicates each of the client states in the first and second sets on a new backup VM for that client state. The method redirects the network traffic flow of each client state in the first set to the corresponding new primary VM for that client state.

A system for providing fault tolerance on a virtual machine (VM) cluster, according to another embodiment of the invention, includes a first computer having a processor, a computer-readable storage device, and a program embodied on the storage device for execution by the processor. The program has a plurality of program modules. The system identifies a client state, wherein the client state is a subset of a corresponding client session having a network traffic flow directed to a primary VM on a VM cluster, and replicates the identified client state on a backup VM in the VM cluster according to a predefined criteria. The system detects a failing VM in the VM cluster and determines a first set of client states for which the failing VM is a primary VM, and a second set of client states for which the failing VM is a backup VM. The system designates the backup VM for each of the client states in the first as a new primary VM for that client state, and replicates each of the client states in the first and second sets on a new back VM for that client state. The system redirects the network traffic flow of each client state in the first set to the corresponding new primary VM for that client state.

According to a further embodiment of the disclosed invention, a computer program product for providing fault tolerance on a virtual machine cluster includes a computer-readable storage medium having program code embodied therewith that is readable and executable by a first processor of a first computer to perform a method. Through the processor, the method identifies a client state, wherein the client state is a subset of a corresponding client session having a network traffic flow directed to a primary virtual machine (VM) on a VM cluster. The method detects a failing VM in the VM cluster, and determines a first set of client states for which the failing VM is a primary VM, and a second set of client states for which the failing VM is a backup VM. The method designates the backup VM for each of the client states in the first set as a new primary VM for that client state, and replicates each of the client states in the first and second sets on a new backup VM for that client state. The method redirects the network traffic flow of each client state in the first set to the corresponding new primary VM for that client state.

DETAILED DESCRIPTION

Figure 3:
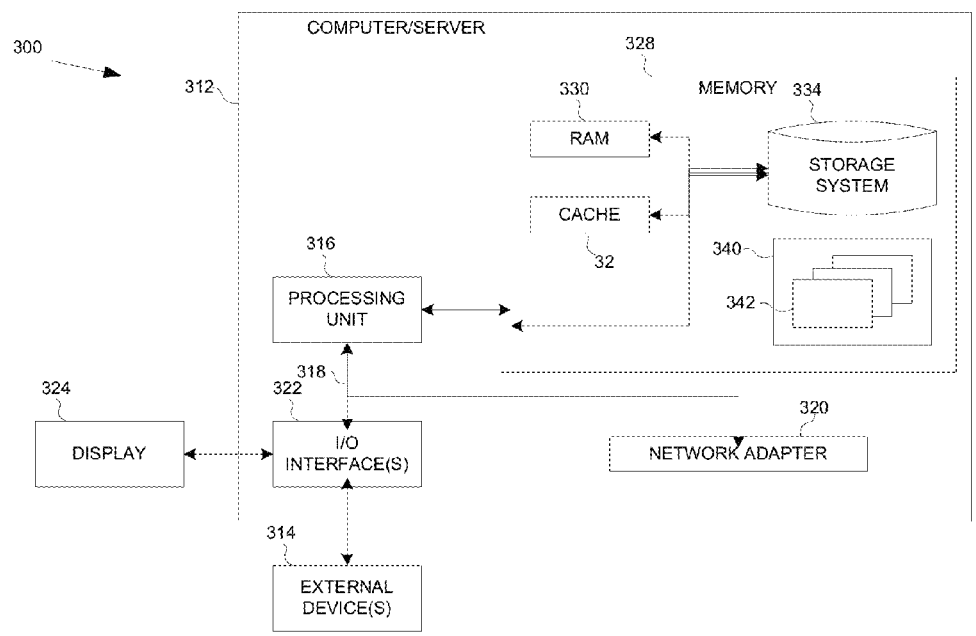
FIG. 3 is a schematic block diagram of a computer system according to an embodiment of the disclosed invention.

Referring to FIG. 3, a schematic of an exemplary computing system is shown. The computer system 300 may be used by to implement the fault tolerance solutions of the disclosed invention. The computer system 300 is one example of a suitable computer system and is not intended to suggest any limitation as to the scope of use or functionality of embodiments of the invention described herein.

In the computer system 300, shown in FIG. 3, a computer/server 312 is operational with numerous other general purpose or special purpose computing system environments or configurations. Examples of well-known computing systems, environments, and/or configurations that may be suitable for use with the computer/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer/server 312 may be described in the general context of computer system-executable instructions, such as program modules, being executed by the computer system 300. Generally, program modules may include routines, programs, objects, components, logic, data structures, and so on that perform particular tasks or implement particular abstract data types. The computer/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 31, the computer/server 312 in the computer system 300 is shown in the form of a general-purpose computing device. The components of the computer/server 312 may include, but are not limited to, one or more processors or processing units 316, a system memory 328, and a bus 318 that couples various system components including the system memory 328 to the processor 316.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 312 typically includes a variety of computer system readable media. Such media may be any available media that is accessible by the computer/server 312, and it includes both volatile and non-volatile media, removable and non-removable media.

The system memory 328 can include computer system readable media in the form of volatile memory, such as random access memory (RAM) 330 and/or cache memory 332. The computer/server 312 may further include other removable/non-removable, volatile/non-volatile computer system storage media. By way of example only, the storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 328 may include at least one program product having a set (e.g., at least one) of program modules that are configured to carry out the functions of embodiments of the invention.

The program/utility 340, having a set (at least one) of program modules 342, may be stored in the memory 328 by way of example, and not limitation, as well as an operating system, one or more application programs, other program modules, and program data. Each of the operating system, one or more application programs, other program modules, and program data or some combination thereof, may include an implementation of a networking environment. The program modules 342 generally carry out the functions and/or methodologies of embodiments of the invention as described herein.

The computer/server 312 may also communicate with one or more external devices 314 such as a keyboard, a pointing device, a display 324, etc.; one or more devices that enable a user to interact with the computer/server 312; and/or any devices (e.g., network card, modem, etc.) that enable the computer/server 312 to communicate with one or more other computing devices. Such communication can occur via Input/ Output (I/O) interfaces 322. Still yet, computer the system/ server 312 can communicate with one or more networks such as a local area network (LAN), a general wide area network (WAN), and/or a public network (e.g., the Internet) via a network adapter 320. As depicted, the network adapter 320 communicates with the other components of the computer/server 312 via the bus 318. It should be understood that although not shown, other hardware and/or software components could be used in conjunction with the computer/server 312. Examples, include, but are not limited to: microcode, device drivers, redundant processing units, external disk drive arrays, RAID systems, tape drives, and data archival storage systems, etc.

Referring now to FIGS. 3 and 4A-5C, a method 400, according to an embodiment of the disclosed invention, may provide a fault tolerance solution for a cluster 500 of VMs, each of which may be running on one or more computers/servers 312 in system 300 (FIG. 3).

Referring now to FIGS. 2-3, 4A and 5A, the method 400, according to an embodiment of the disclosed invention, provides elastic and lightweight fault tolerance for a cluster 500. The cluster 500 has elements and features similar to the cluster 200 described above in connection with FIGS. 2A-D. Like elements and features, therefore, are similarly numbered in FIGS. 2A-D and 5A-C. The cluster 500 depicted in FIG. 5A includes four client sessions {A, B, C, D}. These client sessions 230 initiate in step 404 of the method 400 by connecting to the network controller 204. For each client session 230, the network controller 204 communicates with the orchestrator 208 in step 408 to select a first VM 212 to serve as a primary servicer ("the primary") for that client session 230. For each client session 230, the network controller 204 further communicates with the orchestrator 208 in step 408 to select a second suitable VM 212 to serve as a backup servicer ("the backup") for that client session 230. A suitable VM 212 is selected using a predefined criteria, which may be made configurable in other embodiments of the disclosed invention. For example, the selection may be made according to the split/merge functionality disclosed in connection with the method 100 to ensure that nodes in the cluster 500 are added or removed to handle increasing or decreasing load; to dynamically rearrange the location of backups; and to ensure that, upon failure at any time, the cluster 500 recovers in a load balanced manner.

Figure 1:
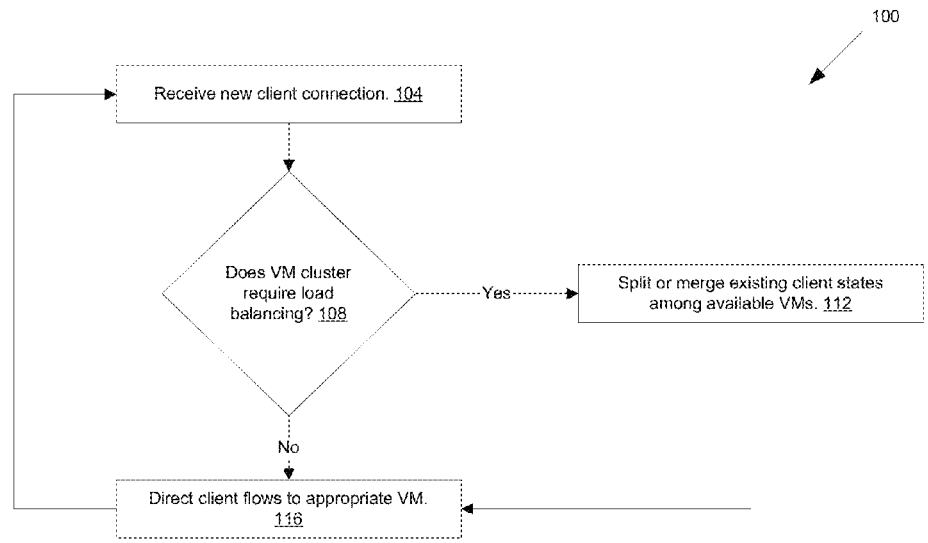
FIG. 1 is a flow chart diagram of a method for balancing the load on a cluster of virtual machines, according to the prior art.
Figure 2A:
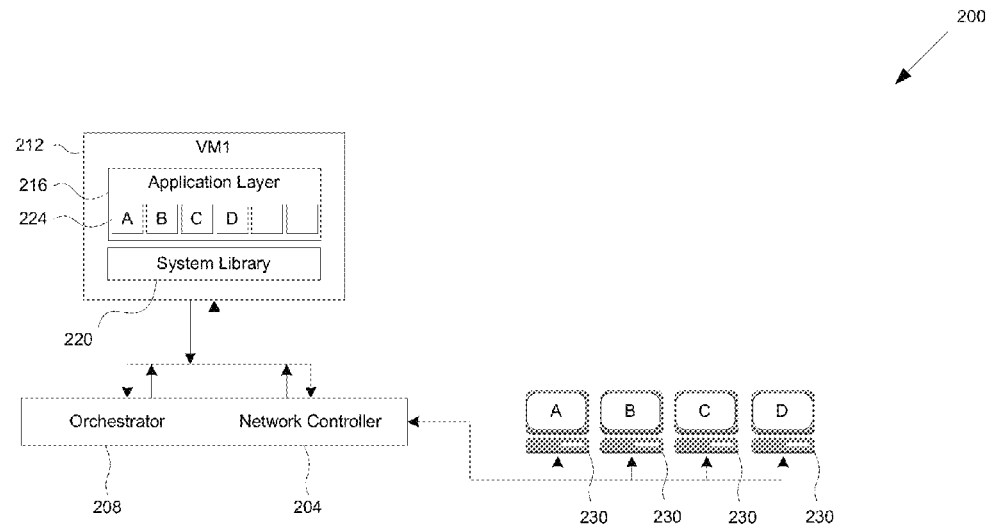
FIG. 2A is a schematic block diagram of a cluster of virtual machines, according to the prior art.
Figure 2B:
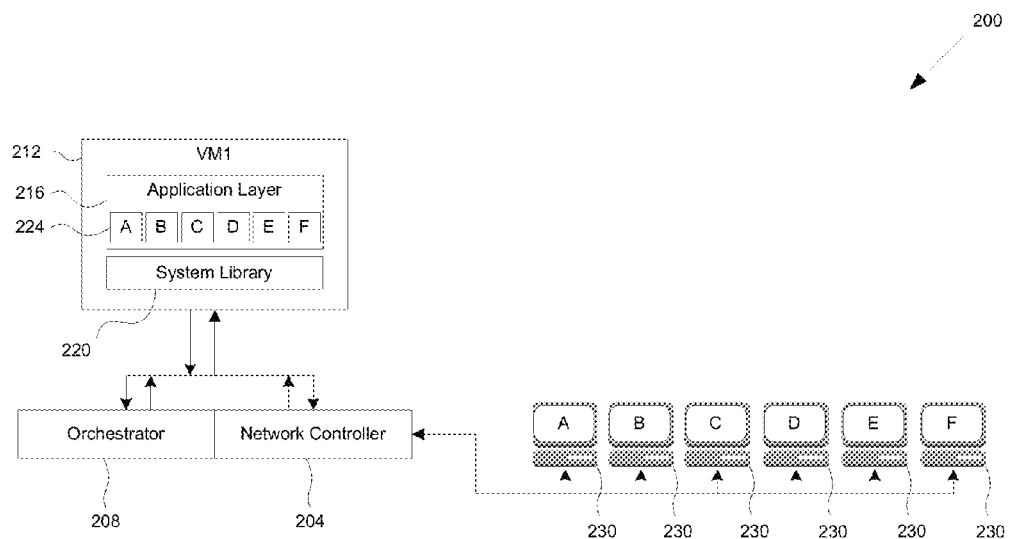
FIG. 2B is a schematic block diagram of a cluster of virtual machines, according to the prior art.
Figure 2C:
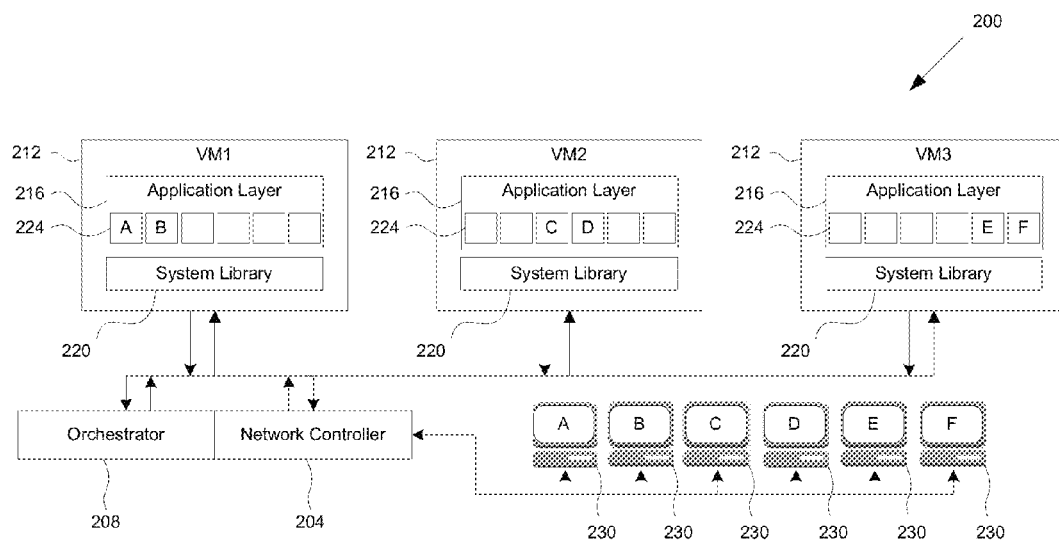
FIG. 2C is a schematic block diagram of a cluster of virtual machines modified by a method to perform a merge operation, according to the prior art.
Figure 2D:
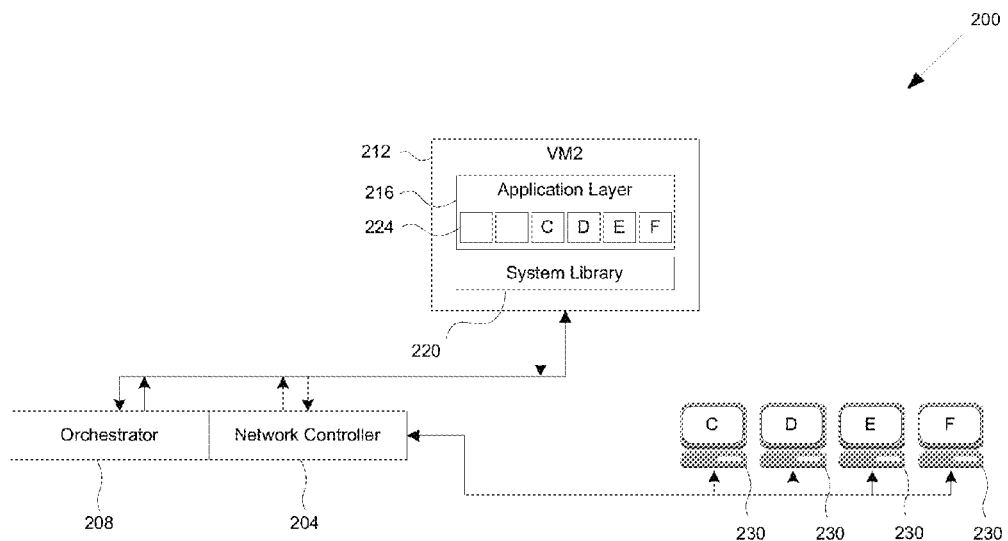
FIG. 2D is a schematic block diagram of a cluster of virtual machines modified by a method to perform a merge operation, according to the prior art.
Figure 4A:
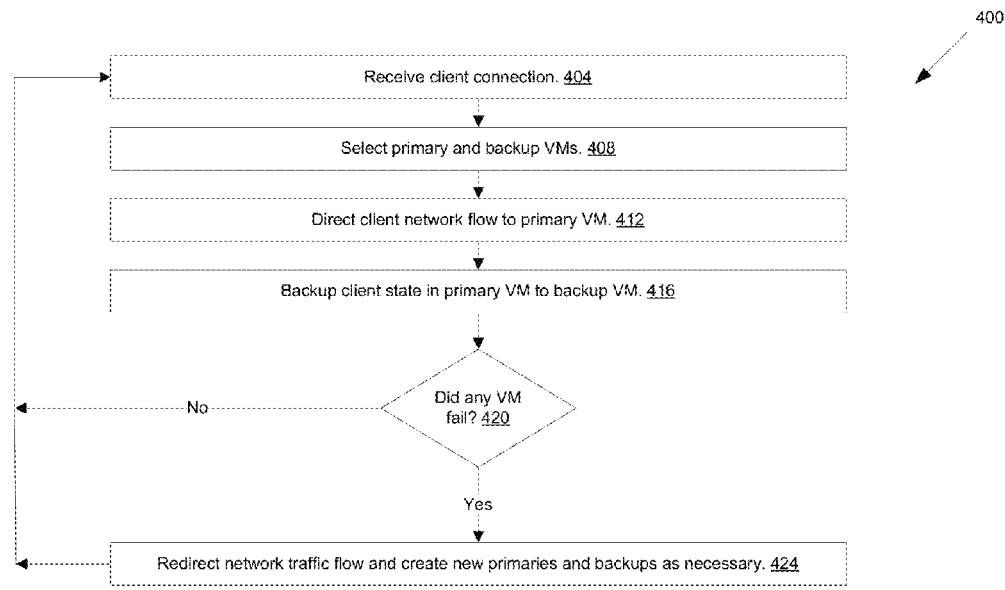
FIG. 4A is a flow chart diagram of method to provide fault tolerance for a cluster of virtual machines, according to an embodiment of the disclosed invention.
Figure 5A:
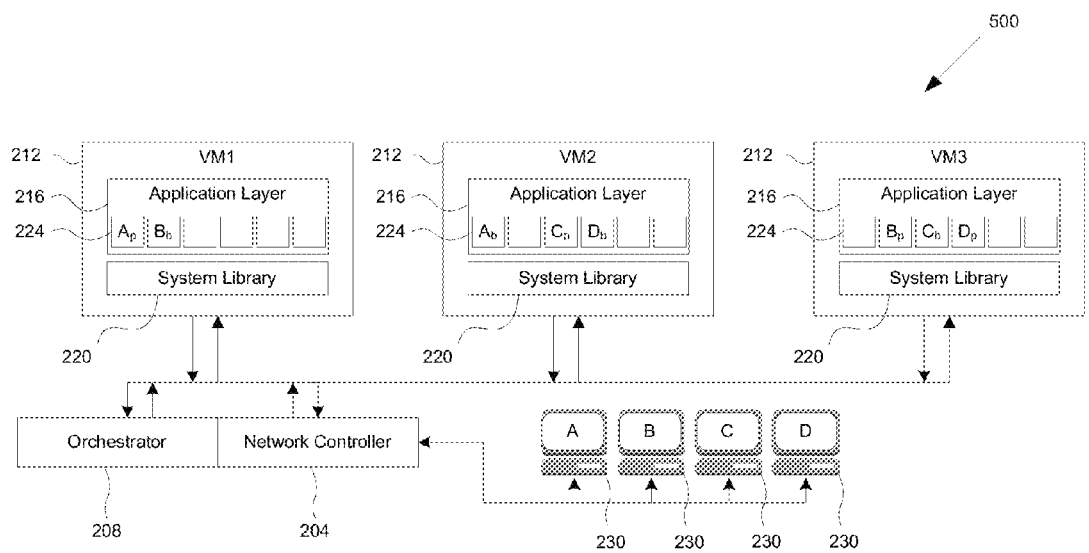
FIG. 5A is a schematic block diagram of a fault tolerant cluster of virtual machines, according to an embodiment of the disclosed invention.
Figure 5B:
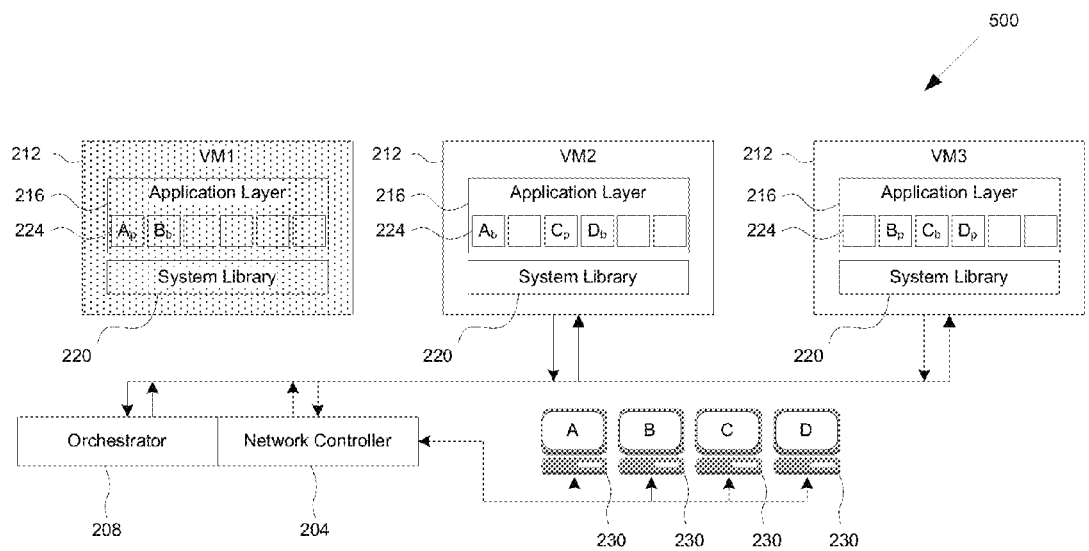
FIG. 5B is a schematic block diagram of a fault tolerant cluster of virtual machines, according to an embodiment of the disclosed invention.
Figure 5C:
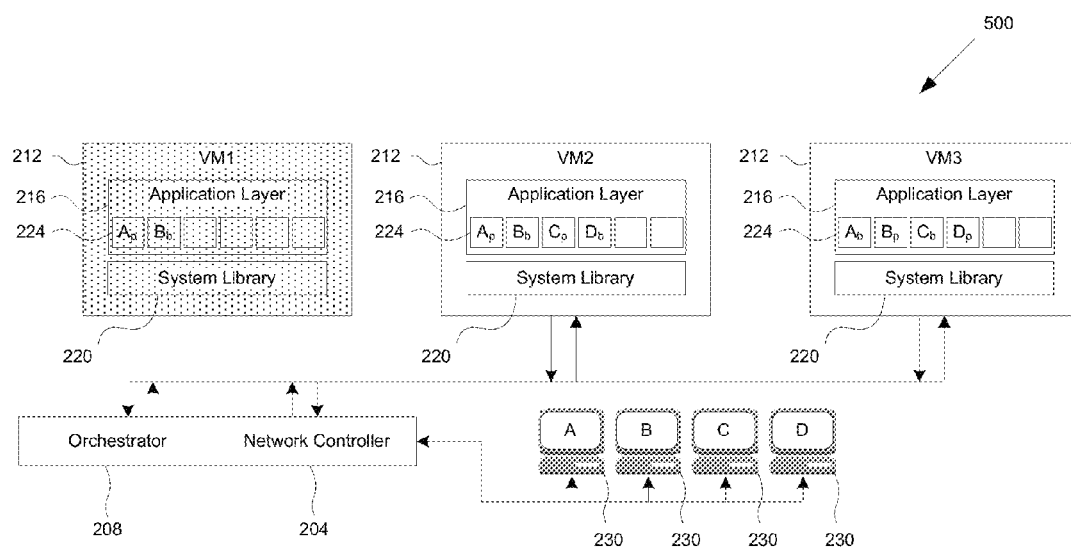
FIG. 5C is a schematic block diagram of a fault tolerant cluster of virtual machines, according to an embodiment of the disclosed invention.

Referring now to FIGS. 4A and 5A, in step 408, the method 400 may select VM1, by way of example, to serve as the primary for client session {A} and as the backup for session {B}; VM2 as the backup for client sessions {A, D} and the primary for client session {C}; and VM3 as the primary for client sessions {B, D}, and the backup for client session {C}. For each primary or backup VM 212, it is the client state 224 that is initiated and/or moved to that VM 212. In FIGS. 5A-C, each client state 224 is depicted using its corresponding letter, followed by a "p" or "b" subscript that indicates whether it is a primary or backup copy. Since the disclosed invention uses the split/merge paradigm of method 100 (FIG. 1) in choosing the primary and backup VMs 212, the resulting cluster 500 load is balanced.

With continued reference to FIGS. 4A and 5A, in step 412, the network controller 204 directs the network traffic flow between each of the active client sessions 230 and its corresponding primary VM 212. The network controller 204 may consult the orchestrator 208 to determine which VM 212 is the primary for the particular client session 230 under processing. According to an embodiment of the invention, the servicing application (in the application layer 216) on the primary may obtain a handle to a client state 224 (by using, for example, a "get_state( )" function). The method 400 may then begin buffering the outbound network traffic flow to the client in order to allow the method 400 to backup the client state 224 in the backup VM 212 in step 416. Once the application releases the client state 224 (for example, through a "put_state( )" function), the method 400 may checkpoint the client state 224 and its network connection state as part of step 416. Checkpoint methods are well understood in the art. Through the checkpointing mechanism the method 400 may, in step 416, continue with the backup process and copy the relevant client state 224 from the primary to the backup VM 212 via the network controller 204. Once the backup is complete, the output of the application is released to the client in the corresponding client session 230.

With continued reference to FIGS. 4A and 5A, the method 400 processes the client states 224 on the VMs 212 in the cluster 500 so that the cluster 500 is fault tolerant. Since the selection of the primary and backup VMs 212 for the client state 224 of each client session 230 is made using the split/merge approach (described in connection with FIGS. 1 and 2A-D), the cluster 500 is also load balanced.

Referring now to FIGS. 4A and 5B, the method 400 determines in step 420 whether any of the VMs 212 on the cluster 500 has failed. In the example depicted in FIG. 5B, VM1 has failed, leaving VM2 and VM3 as the only other available VMs 212 on the cluster 500. As shown in FIG. 5A, prior to its failure, VM1 holds the primary copy of the client state 224 for client session {A}, and the backup copy of the client state 224 for client session {B}. With VM1 no longer available, client session {A} does not have a primary copy. Furthermore, client session {B} does not have a backup. After detecting the failure, the method 400 creates new primaries and backup as necessary for the client sessions {A, B} in step 424.

Figure 4B:
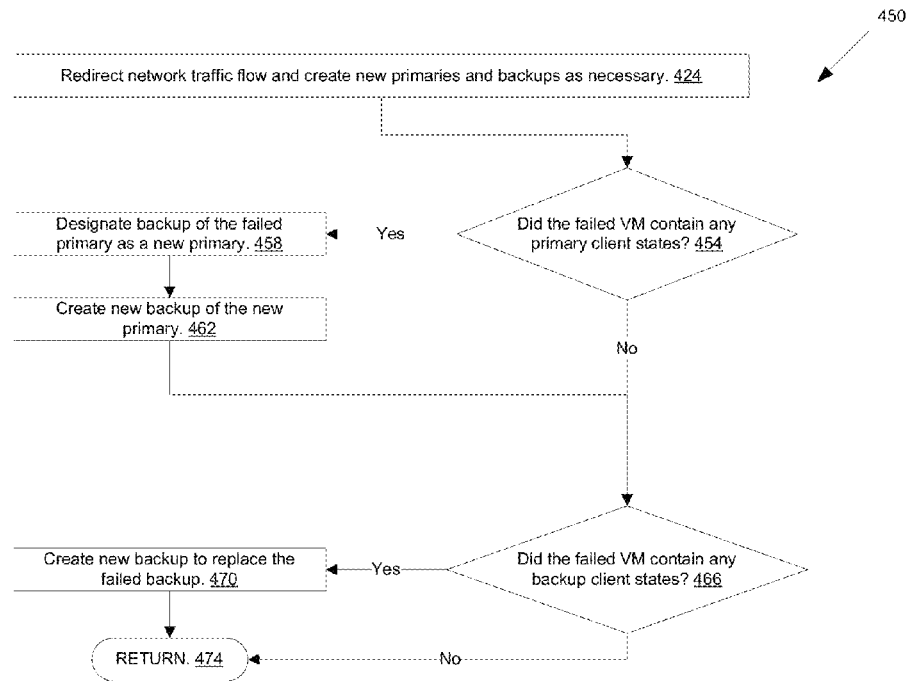
FIG. 4B is a flow chart diagram of sub routine of the method in FIG. 4A to provide fault tolerance for a cluster of virtual machines, according to an embodiment of the disclosed invention.

Referring now to FIGS. 4A-B and 5B, a method 450 according to an embodiment of the disclosed invention creates new primaries and backups of client states 224 on failed VMs 212. The method 450 may be implemented as a subroutine implementing step 424 of the method 400 (FIG. 4A). The method 450 determines whether the failed VM 212 contains any primary client states 224 in step 454. In the example depicted in FIG. 5B, VM1 is the failed VM 212 and holds the primary copy for client session {A}. In step 458, the method 450 designates the backup copy of client session {A} as a new primary. Since the backup copy of the client state 224 of client session {A} is promoted to a new primary copy, it is left without a backup. Consequently, in step 462, the method 450 creates a new backup copy. The method 450 also determines, in step 466, whether the failed VM 212 contains any failed backups. In the example depicted in FIG. 5B, VM1 contains the backup for client session {B}. Since this backup is lost, the method 450 creates a new backup in step 470. The method 450 ends in step 474 and returns to the method 400.

With continued reference to FIGS. 4A-B and 5B, the method 450 determines the status of the client states 224 on the failed VM 212 by consulting the orchestrator 208 which tracks each VM 212 in the cluster 500 and the status and designation of each client state 224. The method 450 consults the orchestrator 208 for the additional reason of determining which available VM 212 is suitable to host a new primary or a new backup copy of a lost client state 224 on a failed VM 212. The transfer of the client states 224 to new VMs 212 is facilitated by the network controller 204.

Referring now to FIGS. 4A-B and 5C, the results of the operations of the methods 400 450 on the cluster 500 depicted in FIG. 5B are shown. The backup copy of client session {A} on VM2 is promoted to a primary copy, and a new backup copy is created on VM3. A new backup copy of client session {B} is created on VM 2.

Referring now to FIGS. 4A-B and 5A-C, after a failure is detected by the method 400 in step 420, and in addition to creating new backups and primaries as described above, the network controller 204 redirects the network traffic flow associated with a failed VM 212 as follows: the network traffic flow for a lost primary client state 224 is rerouted to the backup VM 212 for that client state (with the backup receiving an updated designation of a new primary); the network traffic flow for a lost backup client state 224 continues to be routed to the original primary for that client state 224, and a new backup is created.

With continued reference to FIGS. 4A-B and 5A-C, embodiments of the disclosed invention allow a cluster, such as the cluster 500, to be load balanced and fault tolerant, because the invention augments the load balancing of the split/merge paradigm with the fault tolerance paradigm of the methods 400 and 450. The resulting cluster 500 is therefore also elastic, responding easily to changing cluster 500 characteristics such as swings in the number of client sessions 230 and/or the number of available VMs 212 that process them. The fault tolerance provided by the disclosed invention is also light weight and uses much less in resources than other fault tolerance methods. By backing up the entirety of VMs 212 (including their application and operating system states), other fault tolerance methods needlessly use network bandwidth, memory, and other valuable computing resources, resulting in poor performance, slow recovery times, and ultimately dissatisfied users. In addition to solving these problems, the disclosed invention is transparent to both the application layer 216 running on the VMs 212 as well as the clients initiating the client sessions 230. Moreover, by providing seamless backups of client states 224, the client session 230 need not reconnect to the cluster 500 since the connection information is contained in the backup.

Embodiments of the disclosed invention may include, without limitation, session oriented network applications or network flow oriented applications that process a network traffic flow between a client and a server. Such applications include any software that has a state specific to the processing of a particular network flow. Non-limiting examples include web servers and middlebox applications (which may include packet processors, firewalls, intrusion detectors, protocol accelerators, or proxies).

Figure 6:
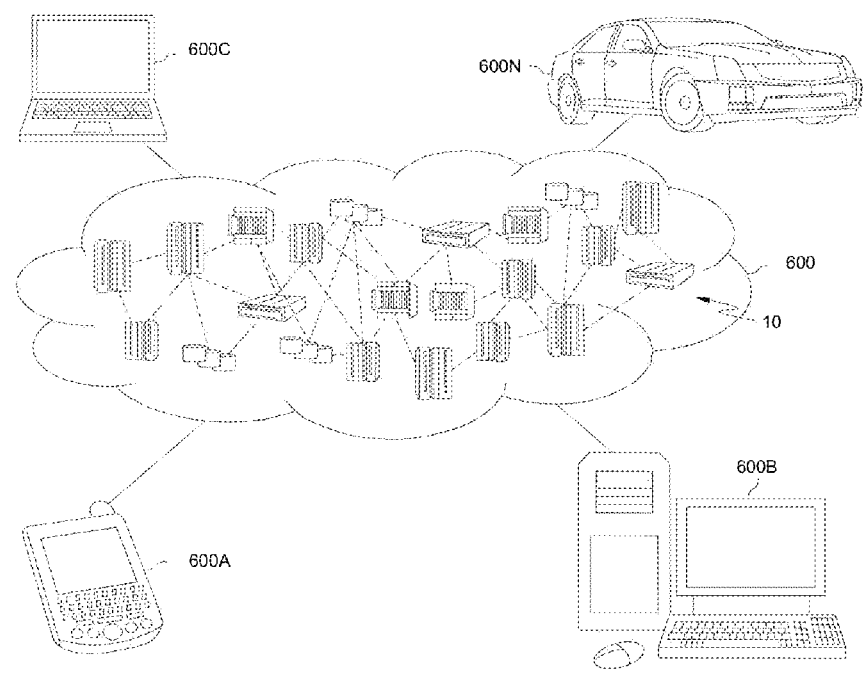
FIG. 6 is a schematic block diagram of an illustrative cloud computing environment, according to an embodiment of the disclosed invention.

Referring now to FIG. 6, an illustrative cloud computing environment 600 is depicted. As shown, the cloud computing environment 600 comprises one or more cloud computing nodes 10 with which local computing devices used by cloud consumers, such as, for example, a personal digital assistant (PDA) or a cellular telephone 600A, a desktop computer 600B, a laptop computer 600C, and/or an automobile computer system 600N, may communicate. The nodes 10 may communicate with one another. They may be grouped (not shown) physically or virtually, in one or more networks, such as Private, Community, Public, or Hybrid clouds as described hereinabove, or a combination thereof. This allows the cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that the computing nodes 10 and the cloud computing environment 600 can communicate with any type of computerized device over any type of network and/or network addressable connection (e.g., using a web browser).

Figure 7:
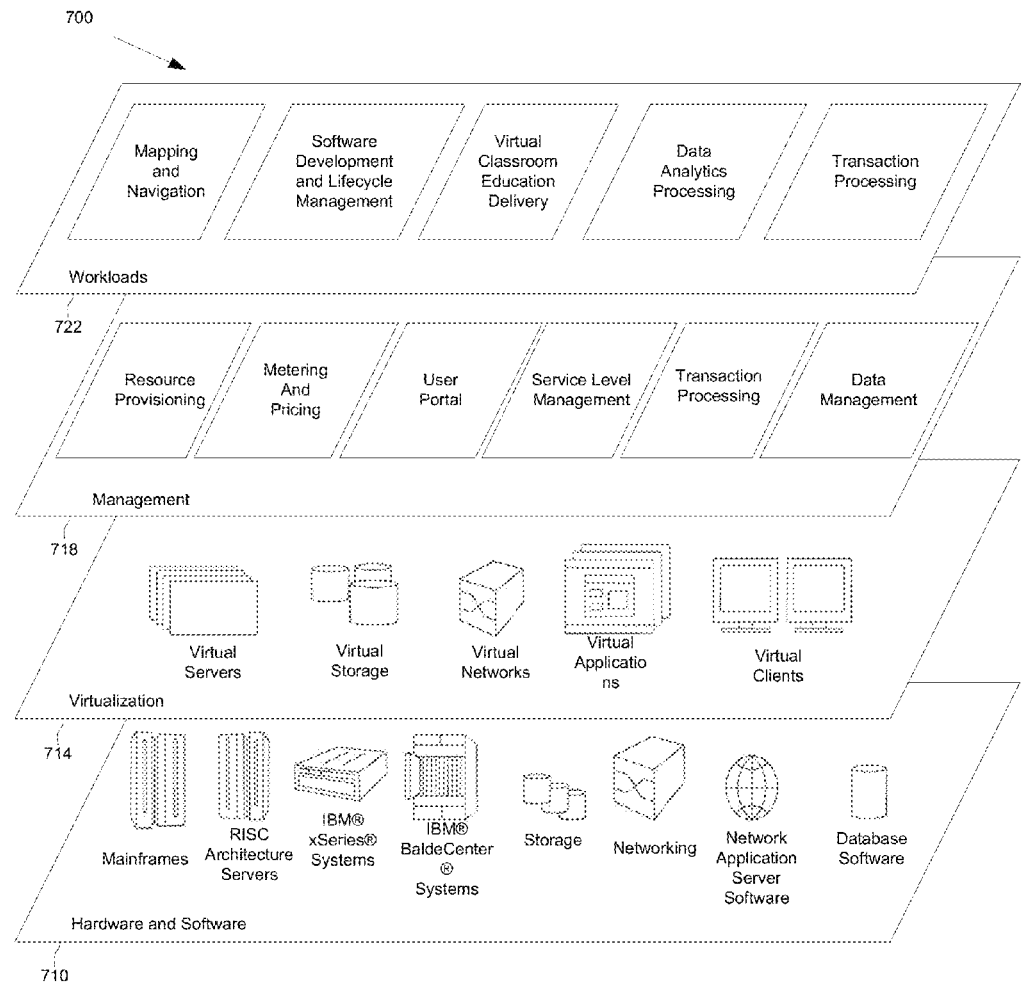
FIG. 7 is a schematic block diagram for a multi-layered functional illustration of the cloud computing environment depicted in FIG. 6, according to an embodiment of the disclosed invention.

Referring now to FIG. 7, a set of functional abstraction layers provided by the cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

The hardware and software layer 710 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 714 provides an abstraction layer from which the following examples of virtual entities may be provided: virtual servers; virtual storage; virtual networks, including virtual private networks; virtual applications and operating systems; and virtual clients.

In one example, the management layer 718 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 722 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a management system for transferring VM images 208, such as the method 100.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for providing fault tolerance on a virtual machine (VM) cluster, comprising:
   maintaining a plurality of VMs in a VM cluster servicing a plurality of client sessions each having a network traffic flow directed to the VM cluster;
   generating a primary client state and a backup client state for each client session according to a predefined criteria, wherein the primary client state and the backup client state are hosted on separate instances of the VMs in the VM cluster;
   directing the network traffic flow of each of the client sessions to the VM hosting the primary client state of the client session;
   detecting a failing VM in the VM cluster;
   designating the backup client states of the primary client states hosted on the failing VM as new primary client states and directing the network traffic flow of the corresponding client sessions to the VMs hosting the new primary client states; and generating a new backup client state for each of the backup client states hosted on the failing VM and a new backup for each of the new primary client states.

2. The method of claim 1, wherein the plurality of VMs in the VM cluster run a corresponding plurality of applications that service one or more of the plurality of client sessions and their respective client states.

3. The method of claim 2, wherein at least one of the plurality of applications is a session oriented network application or a network flow oriented application.

4. The method of claim 2, wherein at least one of the plurality of applications is a webserver or a middlebox application.

5. The method of claim 1, wherein the step of generating a backup client state is performed periodically.

6. The method of claim 1, wherein a frequency of performing the step of generating a client state and a number of backups is configurable.

7. The method of claim 1, wherein the predefined criteria includes a split/merge paradigm.

8. A system for providing fault tolerance on a virtual machine (VM) cluster, comprising:
 a first computer having a processor, and a computer-readable storage device; and
 a program embodied on the storage device for execution by the processor, the program having a plurality of program modules, including:
  a maintaining module configured to maintain a plurality of VMs in a VM cluster servicing a plurality of client sessions each having a network traffic flow directed to the VM cluster;
  a first generating module configured to generate a primary client state and a backup client state for each client session according to a predefined criteria, wherein the primary client state and the backup client state are hosted on separate instances of the VMs in the VM cluster;
  a directing module configured to directing the network traffic flow of each of the client sessions to the VM hosting the primary client state of the client session;
  a detecting module configured to detect a failing VM in the VM cluster;
  a designating module configured to designate the backup client states of the primary client states hosted on the failing VM as new primary client states and to direct the network traffic flow of the corresponding client sessions to the VMs hosting the new primary client states; and
  a second generating module configured to generate a new backup client state for each of the backup client states hosted on the failing VM and a new backup for each of the new primary client states.

9. The system of claim 8, wherein the plurality of VMs in the VM cluster run a corresponding plurality of applications that service one or more of the plurality of client sessions and their respective client states.

10. The system of claim 9, wherein at least one of the plurality of applications is a session oriented network application or a network flow oriented application.

11. The system of claim 9, wherein at least one of the plurality of applications is a webserver or a middlebox application.

12. The system of claim 8, wherein the step of generating a backup client state in the first generating module is performed periodically.

13. The system of claim 8, further comprising:
 a plurality of additional computers in a network, each additional computer having a processor and a computer readable storage device configured to execute the program of the first computer, wherein each of the first computer and the additional computers maintain one or more VMs in the VM cluster.

14. The system of claim 8 further comprising a network controller and an orchestrator.

15. The system of claim 8 wherein the predefined criteria includes a split/merge paradigm.

16. A computer program product for providing fault tolerance on a virtual machine (VM) cluster, the computer program product comprising a non-transitory computer-readable storage medium having program code embodied therewith, the program code readable/executable by a first processor of a first computer to perform a method comprising:
 maintaining a plurality of VMs, by the processor, in a VM cluster servicing a plurality of client sessions each having a network traffic flow directed to the VM cluster;
 generating a primary client state and a backup client state, by the processor, for each client session according to a predefined criteria, wherein the primary client state and the backup client state are hosted on separate instances of the VMs in the VM cluster;
 directing the network traffic flow of each of the client sessions, by the processor, to the VM hosting the primary client state of the client session;
 detecting a failing VM in the VM cluster, by the processor;
 designating the backup client states of the primary client states hosted on the failing VM as new primary client states, by the processor, and directing the network traffic flow of the corresponding client sessions, by the processor, to the VMs hosting the new primary client states; and
 generating a new backup client state, by the processor, for each of the backup client states hosted on the failing VM and a new backup for each of the new primary client states.

17. The computer program product of claim 16, wherein the plurality of VMs in the VM cluster run a corresponding plurality of applications that service one or more client states and their respective client sessions.

18. The computer program product of claim 17, wherein at least one of the plurality of applications is a session oriented network application or a network flow oriented application.

19. The computer program product of claim 16, wherein a frequency of performing the step of generating a backup client state and a number of backups is configurable.

20. The computer program product of claim 16, wherein the predefined criteria includes a split/merge paradigm.

* * * * *